United States Patent
Yurchenko et al.

(10) Patent No.: US 9,363,163 B2
(45) Date of Patent: Jun. 7, 2016

(54) GROUP COMMUNICATION SYSTEM ARRANGEMENT

(71) Applicant: Codership Oy, Helsinki (FI)

(72) Inventors: Alexey Yurchenko, Espoo (FI); Sesppo Jaakola, Helsinki (FI); Teemu Ollakka, Oulu (FI)

(73) Assignee: Codership Oy, Helsinki (FI)

( * ) Notice: Subject to any disclaimer, the term of this patent is extended or adjusted under 35 U.S.C. 154(b) by 265 days.

(21) Appl. No.: 13/867,256

(22) Filed: Apr. 22, 2013

(65) Prior Publication Data

US 2014/0317246 A1   Oct. 23, 2014

(51) Int. Cl.
- *G06F 15/16* (2006.01)
- *H04L 12/721* (2013.01)
- *G06F 17/30* (2006.01)
- *H04L 12/24* (2006.01)

(52) U.S. Cl.
CPC ........ *H04L 45/124* (2013.01); *G06F 17/30575* (2013.01); *H04L 41/0893* (2013.01); *H04L 41/0826* (2013.01)

(58) Field of Classification Search
CPC ..... H04L 45/12; H04L 45/122; H04L 45/123; H04L 45/126
USPC .......................................................... 709/248
See application file for complete search history.

(56) References Cited

U.S. PATENT DOCUMENTS

| | | | |
|---|---|---|---|
| 2006/0004858 A1 | 1/2006 | Tran et al. | |
| 2006/0031450 A1* | 2/2006 | Unrau et al. | 709/223 |
| 2009/0037507 A1 | 2/2009 | Rosman et al. | |
| 2010/0010992 A1* | 1/2010 | Morris | 707/6 |
| 2011/0302242 A1* | 12/2011 | Kim et al. | 709/203 |
| 2014/0044015 A1* | 2/2014 | Chen et al. | 370/255 |
| 2014/0348087 A1* | 11/2014 | Wu et al. | 370/329 |

* cited by examiner

*Primary Examiner* — Douglas Blair
(74) *Attorney, Agent, or Firm* — Ziegler IP Law Group, LLC

(57) ABSTRACT

A group communication system arrangement is provided. The group communication system arrangement includes a configuration of nodes, which are uniquely identified by corresponding identifiers (ID). The nodes are mutually coupled in communication, and are operable to exchange data amongst themselves. Further, the nodes are grouped into proximity segments, depending upon communication characteristics between the nodes. A node of a given second proximity segment of the proximity segments is selected for receiving data to be synchronized. The node of the given second proximity segment is selected based upon an ID of a node of a given first proximity segment of the proximity segments, which is operable to send the data to the node of the given second proximity segment.

19 Claims, 6 Drawing Sheets

GROUP COMMUNICATION SYSTEM ARRANGEMENT

FIELD

The aspects of the present disclosure generally relate to data communication between nodes in a network, and more specifically, to group communication system. Example use case for the group communication system is a database cluster arrangements for sending and receiving data between nodes of the database cluster. Further, the present disclosure relates to methods of operating the database cluster arrangements. Furthermore, the present disclosure also relates to software products recorded on machine-readable data storage media, wherein the software products are executable upon computing hardware to implement aforesaid methods.

BACKGROUND

Group communication system (GCS) refers to a communication system where communication is based, or includes, communication using one-to-many type of protocols. Example of such protocols is multicast and broadcast protocols.

One example environment for the embodiments is a database cluster arrangement (referred also in the disclosure as database management system (DBMS) or database arrangement). A typical database cluster arrangement includes a plurality of database servers that communicate with each other for replication and synchronization purposes. Transactions processing in a database server will be replicated to other database servers in the cluster, for example, by sending unicast, multicast or broadcast messages. It is desirable that replication be performed in a reliable and fast manner.

Further, some of the database servers may be located far away from each other, and be coupled via Wide Area Networks (WANs). As WANs typically have limited support for multicast or broadcast messages to be sent, separate unicast messages are required to be sent to these database servers. Moreover, WANs often have limited throughput, and are often unable to cope with varying demands of network traffic.

In another conventional database cluster arrangement, a client-server approach is implemented by using a dedicated 'daemon' for each cluster of database servers. When a particular database server is updated, that particular database server sends a message to its dedicated daemon. The daemon then propagates the message to other daemons dedicated to other clusters, which then propagate the message to database servers in their respective clusters.

However, this conventional technique also suffers from a number of disadvantages. Firstly, using a daemon for propagating messages adds an additional hop in communication. Secondly, a daemon can become a communication bottleneck if it has too many database servers as its clients. Thirdly, a daemon is a single point of failure in a cluster. In an event of failure of the daemon, the whole cluster may become inaccessible.

Therefore, there exists a need for a database cluster arrangement that is capable of facilitating reliable and efficient communication and synchronization of data.

SUMMARY OF THE DISCLOSURE

The present disclosure seeks to provide a group communication system arrangement.

The present disclosure also seeks to provide a method of operating the database cluster arrangement.

In one aspect, embodiments of the present disclosure provide a group communication arrangement. The group communication arrangement includes a configuration of nodes, which are uniquely identified by corresponding identifiers (ID). The nodes are mutually coupled in communication, and are operable to exchange data amongst themselves.

Further, the nodes are grouped into proximity segments, depending upon communication characteristics between the nodes. The communication characteristics may, for example, include at least one of:

(a) a mutual Quality-of-Service (QoS) of communication, (b) a communication rate achievable between the nodes, and/or (c) a cost of communication between the nodes.

Optionally, the nodes may be grouped into their respective proximity segments based upon mutually shared Local Area Networks (LAN) to which the nodes belong.

Optionally, the proximity segments may be mutually coupled via Wide Area Networks (WAN).

Beneficially, the nodes may be grouped into the proximity segments in a dynamically changeable manner. For example, the nodes may be grouped and/or regrouped when one or more nodes are added or removed from the database cluster arrangement. The nodes may be grouped and/or regrouped based upon communication characteristics of one or more communication networks via which data is communicated between the nodes.

When a node of a given first proximity segment (hereinafter referred to as 'first node') is updated, the first node sends data to be synchronized to other nodes within the given first proximity segment.

In order to synchronize the data with a given second proximity segment, the first node selects a node of the given second proximity segment (hereinafter referred to as 'second node') for receiving the data to be synchronized, and sends the data to the second node. Consequently, the second node sends or relays/forwards/distributes the data to other nodes within the given second proximity segment.

In accordance with an embodiment of the present disclosure, the second node is selected based upon an ID of the first node.

Optionally, the second node may be addressed based substantially upon an addressing regime. The addressing regime may, for example, be represented as follows:

$$D=(K+S)\% M,$$

where

D is a node index of the second node, or a process associated therewith;

K is a segment index of the given first proximity segment;

S is a node index of the first node, or a process associated therewith;

M is a number of nodes in the given second proximity segment; and

% is a modulus function.

The addressing regime may, for example, be used to select separate nodes of the given second proximity segment for receiving data sent by separate nodes of the given first proximity segment. This enables even distribution of communication load between the nodes of the given second proximity segment, which, in turn, facilitates reliable communication and synchronization thereof.

In addition, the first node provides at least one given node in each of other proximity segments with the data to be synchronized. Subsequently, the at least one given node synchronizes the data mutually with other nodes within its respective proximity segment. In this manner, the data is synchronized mutually with all of the proximity segments.

In another aspect, embodiments of the present disclosure provide a method of operating the group communication arrangement. Additionally embodiments of the present disclosure provide a method of operating the database cluster arrangement.

In yet another aspect, embodiments of the present disclosure provide a software product recorded on machine-readable data storage media, wherein the software product is executable upon computing hardware for implementing the method of operating the database cluster arrangement.

Embodiments of the present disclosure substantially eliminate the aforementioned problems in the prior art, and enable even distribution of communication load between nodes in a database cluster arrangement, facilitate reliable and efficient communication and synchronization of data across WANs, and therefore, enable disaster recovery during events of failure.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
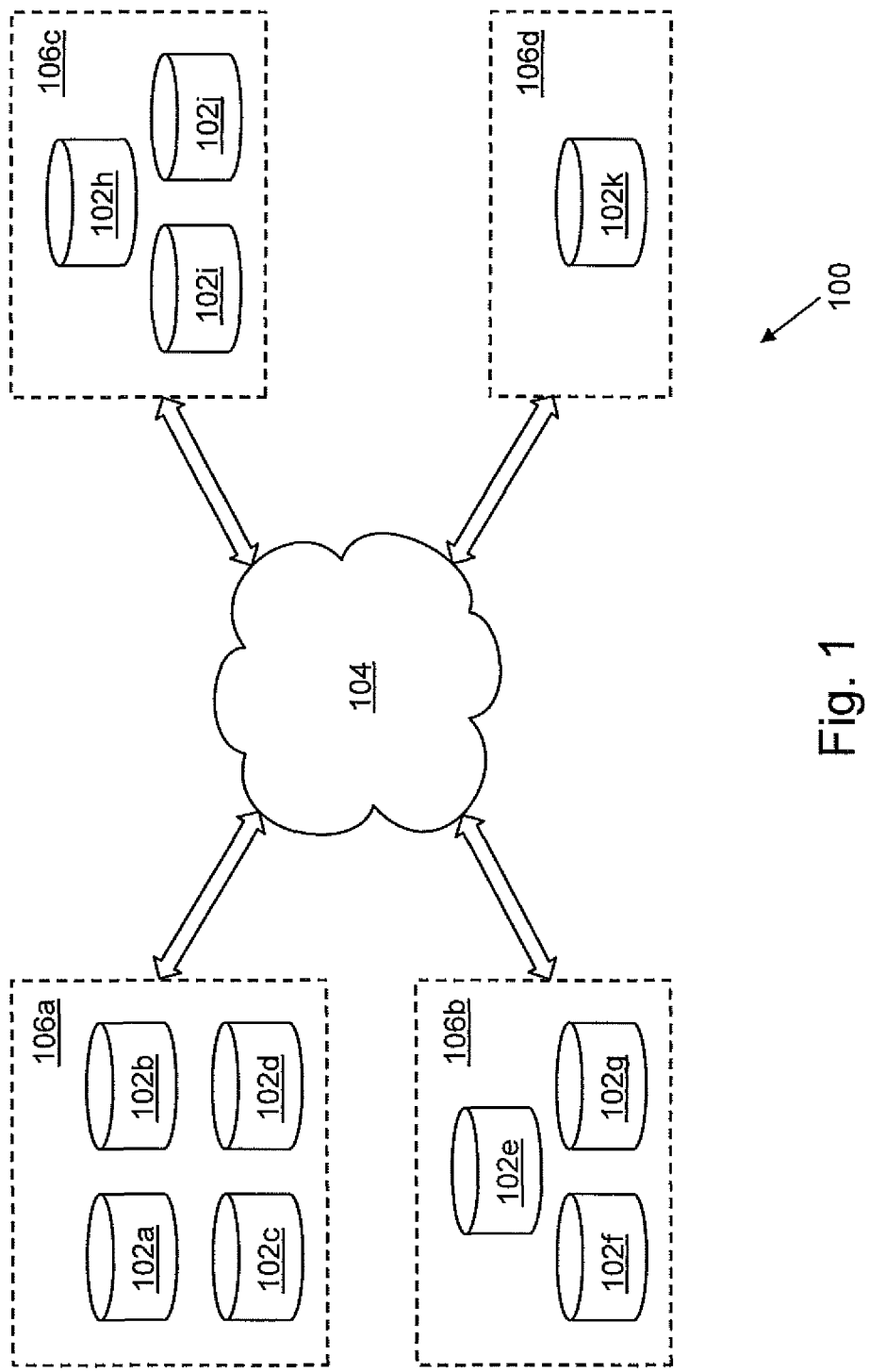
FIG. 1 is a schematic illustration of an example network environment in which a database cluster arrangement is implemented pursuant to the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS OF THE DISCLOSURE

The following detailed description illustrates embodiments of the present disclosure and ways in which it can be implemented. Although the best mode of carrying out the present disclosure has been disclosed, those in the art would recognize that other embodiments for carrying out or practicing the present disclosure are also possible.

Embodiments of the present disclosure provide a group communication system (GCS) arrangement. According to one example the group communication system arrangement can be used in a database cluster arrangement. The database cluster arrangement includes a configuration of nodes, which are uniquely identified by corresponding identifiers (ID). The nodes are mutually coupled in communication, and are operable to exchange data amongst themselves.

The term 'node' refers to a database server, a process associated with a database, or a computing device dedicated to running such a program. In one specific implementation, a database server may be a content delivery server. In general a server can be any server connected to communication network.

Further, the nodes are grouped into proximity segments, depending upon communication characteristics between the nodes. The communication characteristics may, for example, include at least one of:

(a) a mutual Quality-of-Service (QoS) of communication, (b) a communication rate achievable between the nodes, and/or (c) a cost of communication between the nodes.

For example, the nodes may be grouped into their respective proximity segments based upon mutually shared Local Area Networks (LAN) to which the nodes belong, while the proximity segments may be mutually coupled via Wide Area Networks (WAN).

Beneficially, the nodes may be grouped into the proximity segments in a dynamically changeable manner. For example, the nodes may be grouped and/or regrouped when one or more nodes are added or removed from the database cluster arrangement. The nodes may be grouped and/or regrouped based upon communication characteristics of one or more communication networks via which data is communicated between the nodes.

When a particular node is updated (for example, a table or a row is created, modified, or deleted), that particular node sends data to be synchronized to other nodes within its respective proximity segment. In this manner, the particular node synchronizes the data within its respective proximity segment.

Further, the particular node provides at least one given node in each proximity segment with the data to be synchronized. Subsequently, the at least one given node synchronizes the data mutually with other nodes within its respective proximity segment. In this manner, the data is synchronized mutually with all of the proximity segments.

In accordance with an embodiment of the present disclosure, the at least one given node is selected based upon an ID of the particular node. Accordingly, the at least one given node may be addressed based substantially upon an addressing regime.

Referring now to the drawings, particularly by their reference numbers, FIG. 1 is a schematic illustration of an example network environment in which a database cluster arrangement 100 is implemented pursuant to the present disclosure. The database cluster arrangement 100 includes a configuration of nodes, depicted as a node 102*a*, a node 102*b*, a node 102*c*, a node 102*d*, a node 102*e*, a node 102*f*, a node 102*g*, a node 102*h*, a node 102*i*, a node 102*j*, and a node 102*k* (hereinafter collectively referred to as nodes 102).

The nodes 102 are mutually coupled in communication via one or more communication networks, depicted as a communication network 104 in FIG. 1. The communication network 104 provides a communication medium to the nodes 102 for exchanging data amongst themselves.

The communication network 104 can be a collection of individual networks, interconnected with each other and functioning as a single large network. Examples of such individual networks include, but are not limited to, LANs, WANs, and Metropolitan Area Networks (MANs). Further, such individual networks may be wired, wireless, or a combination thereof.

The nodes 102 are grouped into proximity segments, depicted as a proximity segment 106a, a proximity segment 106b, a proximity segment 106c and a proximity segment 106d (hereinafter collectively referred to as proximity segments 106). With reference to FIG. 1, the nodes 102a, 102b, 102c and 102d are grouped into the proximity segment 106a; the nodes 102e, 102f and 102g are grouped into the proximity segment 106b; the nodes 102h, 102i and 102j are grouped into the proximity segment 106c; and the node 102k is grouped into the proximity segment 106d.

Further, the nodes 102 are uniquely identified by corresponding IDs. The corresponding IDs may, for example, be assigned during the grouping of the nodes 102 into the proximity segments 106.

In accordance with an embodiment of the present disclosure, the nodes 102 are provided with suitable hardware and/or software applications that enable the nodes 102 to maintain their corresponding IDs.

Beneficially, an ID of a particular node may be indicative of a proximity segment to which that particular node belongs. The ID of that particular node may include a segment index and/or a node index. For example, the ID of that particular node may be a Universally Unique ID (UUID), which is a 16-octet (i.e., 128-bit) number. In such a case, one or more octets of the UUID may be reserved for providing the segment index and/or the node index.

Beneficially, the segment index may uniquely identify the proximity segment to which that particular node belongs, while the node index may uniquely identify that particular node within the proximity segment. Accordingly, the proximity segments 106 and the nodes 102 may be assigned segment indices and node indices, respectively, in a manner that mutually exclusive pairs of segment indices and node indices are formed.

In order to facilitate unique identification of the proximity segments 106, each of the proximity segments 106 may be assigned a unique segment index. Optionally, the segment indices may be non-negative integers ranging from 0 to (x−1), where 'x' is a number of proximity segments within the database cluster arrangement 100. Alternatively, the segment indices may be discontinuous and arbitrary integers.

In a case when the nodes 102 are not grouped into the proximity segments 106, the segment indices may be a default value. In such a case, all of the nodes 102 may belong to the same proximity segment irrespective of their locations and/or the communication characteristics of the communication network 104.

Further, each node within a particular proximity segment may be assigned a node index unique to that particular proximity segment. Accordingly, the node indices may be non-negative integers ranging from 0 to (y−1), where 'y' is a number of nodes within that particular proximity segment.

Beneficially, the node indices may be continuous non-negative integers. Alternatively, the node indices may be numbers belonging to, for example, a set of odd numbers or a set of even numbers.

Further, the nodes 102 may be grouped into the proximity segments 106, depending upon communication characteristics of the communication network 104 via which data is communicated between the nodes 102. The communication characteristics may, for example, include at least one of:

(a) a mutual QoS of communication, (b) a communication rate achievable between the nodes 102, and/or (c) a cost of communication between the nodes 102.

For example, the nodes 102 may be grouped into their respective proximity segments 106 based upon mutually shared LANs to which the nodes 102 belong, while the proximity segments 106 may be mutually coupled via WANs.

In one example, the nodes 102 may be grouped into the proximity segments 106 based on a cost of communication between the nodes 102. Cost of communication can refer to actual operation cost of a network (i.e. maintenance, electricity etc) or to cost of leasing a communication line. The cost can be allocated based on maximum, typical, average etc. bandwidth and/or amount of data per time unit (such as per hour, day, week, month). Cost of communication can be also function of promised Quality of Service. In some networks for example bandwidth can be high but the network might be unreliable. The cost of communication may be defined as monetary cost of sending a data packet from a first node to a second node, In addition, cost of communication may be indicative of communication data rates achievable between the nodes 102. A large cost of communication between the nodes 102 may, for example, imply a fast communication rate between the nodes 102.

Example cost of communication between the nodes 102 have been provided in a table below. For illustration purposes, the example cost of communication between nodes have been provided in arbitrary units. In this table, A represents the node 102a, B represents the node 102b, C represents the node 102c, D represents the node 102d, E represents the node 102e, F represents the node 102f, G represents the node 102g, H represents the node 102h, I represents the node 102i, J represents the node 102j, and K represents the node 102k.

|   | A  | B  | C  | D  | E  | F  | G  | H  | I  | J  | K  |
|---|----|----|----|----|----|----|----|----|----|----|----|
| A | —  | 1  | 2  | 3  | 20 | 25 | 30 | 69 | 70 | 75 | 90 |
| B | 1  | —  | 3  | 4  | 25 | 30 | 25 | 80 | 75 | 85 | 95 |
| C | 2  | 3  | —  | 2  | 20 | 24 | 30 | 78 | 83 | 77 | 92 |
| D | 3  | 4  | 2  | —  | 30 | 25 | 30 | 62 | 65 | 72 | 88 |
| E | 20 | 25 | 20 | 30 | —  | 4  | 5  | 40 | 50 | 45 | 40 |
| F | 25 | 30 | 24 | 25 | 4  | —  | 2  | 42 | 51 | 47 | 39 |
| G | 30 | 25 | 30 | 30 | 5  | 2  | —  | 54 | 49 | 50 | 36 |
| H | 69 | 80 | 78 | 62 | 40 | 42 | 54 | —  | 6  | 8  | 33 |
| I | 70 | 75 | 83 | 65 | 50 | 51 | 49 | 6  | —  | 7  | 35 |
| J | 75 | 85 | 77 | 72 | 45 | 47 | 50 | 8  | 7  | —  | 37 |
| K | 90 | 95 | 92 | 88 | 40 | 39 | 36 | 33 | 35 | 37 | —  |

Continuing from the previous example, let us consider that the nodes 102 are grouped into the proximity segments 106 such that cost of communications between nodes belonging to a same proximity segment are minimized. Calculations of the cost of communication may be performed as follows:

The number of the nodes 102 in the database cluster arrangement $100 = 11$

An average cost of communication between all of the nodes $102 =$ (sum of all cost of communications)$/(11 \times 10) = 4530/110 = 41.2$ -continued An average cost of communication between the nodes 102a, $$102b, 102c \text{ and } 102d =$$

(sum of cost of communications between the nodes 102a, $$102b, 102c \text{ and } 102d)/(4 \times 3) = 30/12 = 2.5$$

An average cost of communication between the nodes 102e, $$102f \text{ and } 102g =$$

(sum of cost of communication between the nodes 102e, $$102f \text{ and } 102g)/(3 \times 2) = 22/6 = 3.7$$

An average cost of communication between the nodes 102h, $$102i \text{ and } 102j =$$

(sum of cost of communications between the nodes 102h, $$102i \text{ and } 102j)/(3 \times 2) = 42/6 = 7$$

Consequently, the nodes 102a, 102b, 102c and 102d are grouped into the proximity segment 106a; the nodes 102e, 102f and 102g are grouped into the proximity segment 106b; the nodes 102h, 102i and 102j are grouped into the proximity segment 106c; and the node 102k is grouped into the proximity segment 106d, as shown in FIG. 1.

In another example, the nodes 102 may be grouped into the proximity segments 106 based on measured communication speed or round-trip-times between the nodes 102. Accordingly, the nodes 102 may be grouped into the proximity segments 106 such that cost of communication between nodes belonging to a same proximity segment is minimized.

In addition, the nodes 102 may be grouped into the proximity segments 106 based on cost of implementation of the database cluster arrangement 100. The cost of implementation may, for example, correspond to at least one of: cost of setting up the nodes 102 and/or the communication network 104, cost of usage of the communication network 104 as a function of time, and/or cost of mutual QoS of communication between the nodes 102.

Furthermore, the nodes 102 may be grouped into the proximity segments 106 in a dynamically changeable manner. For example, the nodes 102 may be grouped and/or regrouped when one or more nodes are added to, removed from, or modified in the database cluster arrangement 100. In addition, the nodes 102 may be grouped and/or regrouped based upon changes in the communication characteristics of the communication network 104.

Beneficially, the nodes 102 may be grouped and/or regrouped into the proximity segments 106 in an automatic manner, as and when changes in the database cluster arrangement 100 and/or the communication characteristics are identified. Accordingly, the segment indices and/or the node indices may be assigned in an automatic manner. For example, nodes belonging to a particular proximity segment may be sorted based on their Media Access Control (MAC) addresses or other suitable IDs pertaining to the nodes, whereby the node indices may be assigned in an automatic manner.

Alternatively, the nodes 102 may be grouped and/or regrouped into the proximity segments 106 by a system administrator of the database cluster arrangement 100.

In order to illustrate the implementation of the database cluster arrangement 100, let us consider a first example scenario where the node 102a of the proximity segment 106a is updated, for example, by a web service. The node 102a sends data to be synchronized to the nodes 102b, 102c and 102d within the proximity segment 106a. For this purpose, the node 102a may send the data, for example, by using unicast, multicast, broadcast, or other suitable communication protocols available within the proximity segment 106a. In this manner, the data is synchronized within the proximity segment 106a.

Further, the node 102a provides at least one given node in each of the proximity segments 106b, 106c and 106d with the data to be synchronized. Let us consider that the node 102a sends the data to the node 102e of the proximity segment 106b, the node 102h of the proximity segment 106c, and the node 102k of the proximity segment 106d.

Optionally, the node 102a may send the data to the nodes 102e, 102h and 102k separately, for example, by using unicast communication protocol. Accordingly, the node 102a may send separate unicast messages including the data to the nodes 102e, 102h and 102k.

Alternatively, the node 102a may send the data to at least one of the nodes 102e, 102h and 102k, which may then relay the data on behalf of the node 102a to remaining nodes of the nodes 102e, 102h and 102k. Let us consider, for example, that the node 102a sends a unicast message including the data to the node 102e. The node 102e may then relay the unicast message to the nodes 102h and 102k on behalf of the node 102a.

The data may be relayed from one node to another, for example, based on a spanning tree algorithm. In one example, a minimum spanning tree algorithm may be utilized to identify a spanning tree with a cost of communication less than or equal to a cost of communication of other spanning trees. In another example, a maximum spanning tree algorithm may be utilized to identify a spanning tree with a communication rate more than or equal to a communication rate of other spanning trees. The minimum spanning tree algorithm and/or the maximum spanning tree algorithm may, for example, employ suitable greedy algorithms or dynamic programming algorithms.

Optionally, the data may be relayed based on other communication characteristics of the communication network 104. For example, one or more nodes and/or one or more proximity segments within the database cluster arrangement 100 may be accessible by only one or more predefined nodes within the database cluster arrangement 100, based on one or more predefined security policies. The predefined nodes and/or the predefined security policies may, for example, be defined by the system administrator of the database cluster arrangement 100.

Beneficially, upon receiving the data, a node may analyze whether the data has been received from within its respective proximity segment or a different proximity segment. If it is found that the data has been received from within its respective proximity segment, the node may synchronize its associated database using the data. Otherwise, if it is found that the data has been received from a different proximity segment, the node may synchronize its associated database, and send the data to other nodes within its respective proximity segment.

Consequently, the nodes 102e, 102h and 102k send the data to other nodes within their respective proximity segments. Accordingly, the node 102e sends the data to the nodes 102f and 102g within the proximity segment 106b; and the node 102h sends the data to the nodes 102i and 102j within the proximity segment 106c. For this purpose, the nodes 102e and 102h may send the data, for example, by using unicast, multicast, broadcast, or other suitable communication protocols available within the proximity segments 106b and 106c, respectively. In this manner, the data is synchronized mutually with all of the proximity segments 106.

Continuing from the previous example, let us now calculate a total cost of communication taken for synchronization of the data in the database cluster arrangement 100. In accordance with the first example scenario, let us consider that the node 102a sends the data to the nodes 102b, 102c and 102d within the proximity segment 102a. In addition, the node 102a sends the data to the nodes 102e, 102h and 102k of the proximity segments 106b, 106c and 106d, respectively. Further, the node 102e sends the data to the nodes 102f and 102g within the proximity segment 106b, and the node 102h sends the data to the nodes 102i and 102j within the proximity segment 106c. Accordingly, calculations of the cost of communication may be performed as follows:

a cost of communication between the nodes 102a and 102b=1, a cost of communication between the nodes 102a and 102c=2, a cost of communication between the nodes 102a and 102d=3, a cost of communication between the nodes 102a and 102e=20, a cost of communication between the nodes 102a and 102h=69, a cost of communication between the nodes 102a and 102k=90, a cost of communication between the nodes 102e and 102f=4, a cost of communication between the nodes 102e and 102g=5, a cost of communication between the nodes 102h and 102i=6, and a cost of communication between the nodes 102h and 102j=8.

Therefore, the total cost of communication for synchronization of the data in the database cluster arrangement 100 in accordance with the first example scenario=208.

Let us now compare the first example scenario with a conventional database cluster arrangement used in the prior art, where the node 102a would send the data to the nodes 102b, 102c, 102d, 102e, 102f, 102g, 102h, 102i, 102j and 102k via separate messages. In the conventional database cluster arrangement, a total cost of communication for synchronization of the data would be 385. It is evident that the database cluster arrangement 100 facilitates substantially more efficient communication and synchronization of the data, as compared to the conventional database cluster arrangement.

It should be noted here that the implementation of the database cluster arrangement 100 is not limited to a specific number of nodes, proximity segments and communication networks. FIG. 1 is merely an example, which should not unduly limit the scope of the claims herein. One of ordinary skill in the art would recognize many variations, alternatives, and modifications of embodiments herein.

For example, the database cluster arrangement 100 may be implemented as per a master-slave scheme. In such a case, one or more nodes from amongst the nodes 102 may act as master nodes, while other nodes from amongst the nodes 102 may act as slave nodes. As all of the nodes 102 are synchronized, one of the slave nodes may be used to replace a master node in an event of failure of the master node. In this manner, the database cluster arrangement 100 may enable disaster recovery during events of failure.

Further, the database cluster arrangement 100 may be implemented within a configuration of content delivery servers for distributing, for example, video data. Accordingly, the content delivery servers may be grouped into proximity segments. The content delivery servers and the proximity segments may be assigned indices in a similar manner. A suitable addressing regime may then be employed to evenly distribute communication load between the content delivery servers. This may also facilitate reliable communication and synchronization between the content delivery servers. In general the embodiments are not limited to any specific application but can be applied to any group communication system.

Figure 2A:
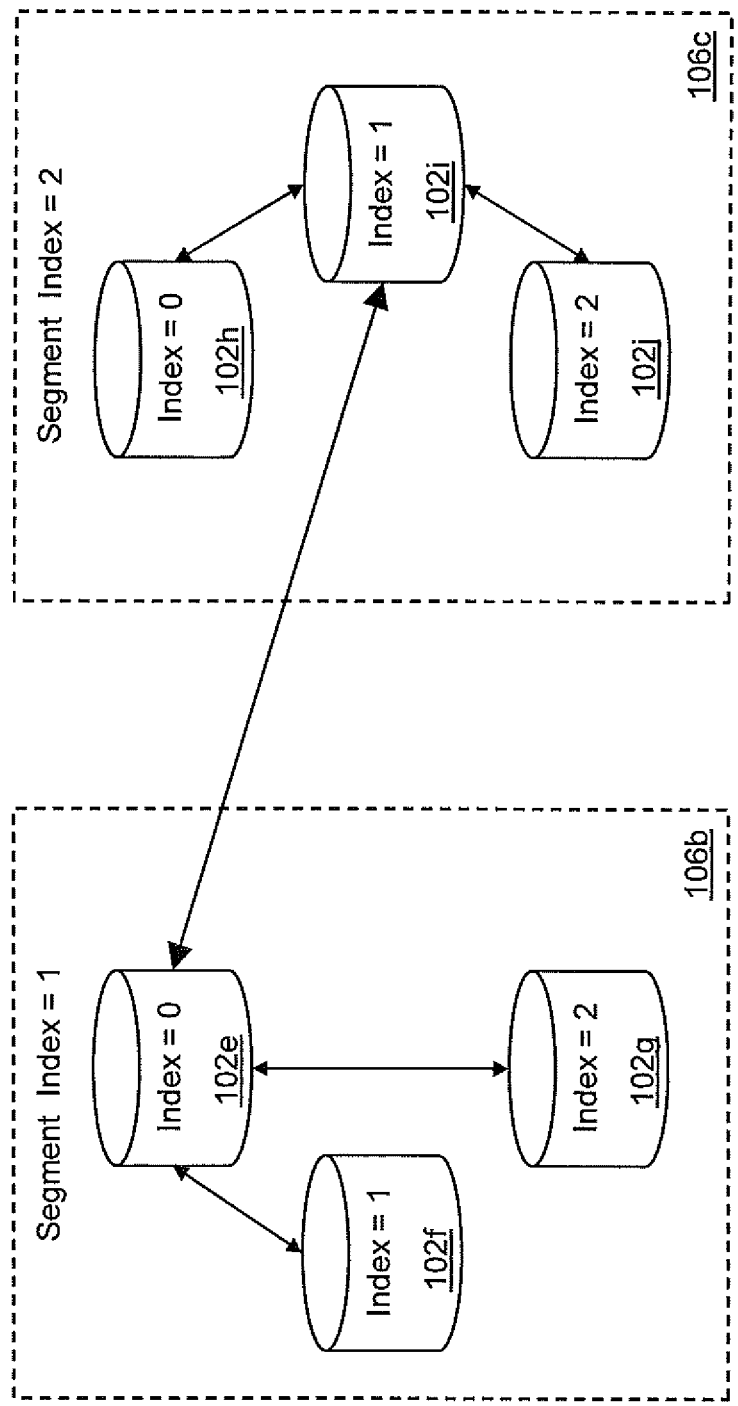
FIGS. 2A and 2B are illustrations of an addressing regime implemented within the database cluster arrangement, in accordance with an embodiment of the present disclosure.
Figure 2B:
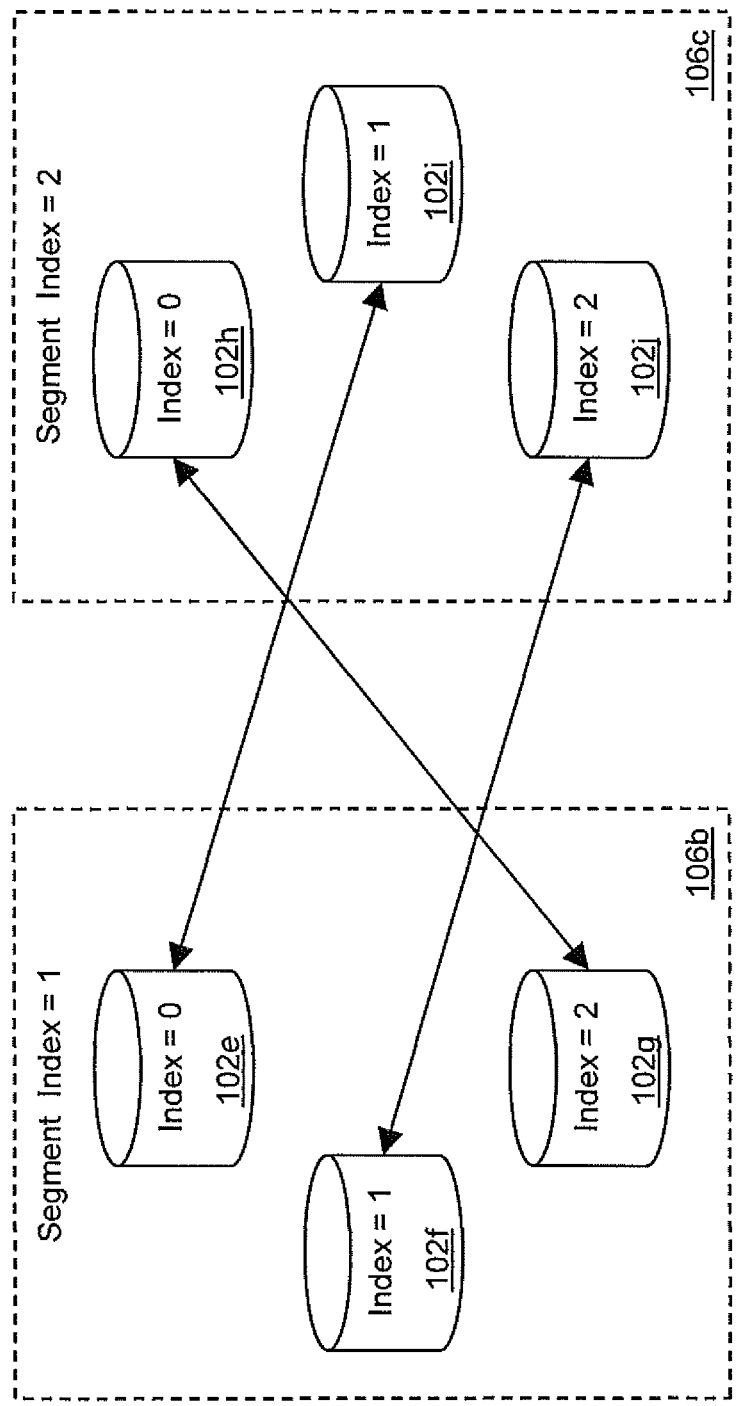

FIGS. 2A and 2B are illustrations of an addressing regime implemented within the database cluster arrangement 100, in accordance with an embodiment of the present disclosure. For illustration purposes, the addressing regime has been employed for synchronizing data within a given first proximity segment and a given second proximity segment.

As described earlier, when a particular node of the given first proximity segment is updated, that particular node provides one given node of the given second proximity segment with the data to be synchronized. The given node of the given second proximity segment may, for example, be selected based upon the ID of that particular node of the given first proximity segment.

Beneficially, the given node of the given second proximity segment may be addressed based substantially upon the addressing regime represented as follows:

$$D=(K+S)\%M,$$

where

D is a node index of the given node of the given second proximity segment, or a process associated therewith;

K is a segment index of the given first proximity segment;

S is a node index of the particular node of the given first proximity segment, or a process associated therewith;

M is a number of nodes in the given second proximity segment; and

% is a modulus function.

For the purposes of the present disclosure, the modulus function '%' may be defined such that an expression 'a % b' provides remainder of division of 'a' by 'b'.

In order to illustrate the implementation of the addressing regime, let us consider a second example scenario with reference to FIGS. 2A and 2B in which the given first proximity segment is the proximity segment 106b and the given second proximity segment is the proximity segment 106c.

Let us consider that segment indices and node indices have been assigned as follows:

a segment index of the proximity segment 106b=1, a node index of the node 102e of the proximity segment 106b=0, a node index of the node 102f of the proximity segment 106b=1, a node index of the node 102g of the proximity segment 106b=2, a segment index of the proximity segment 106c=2, a node index of the node 102h of the proximity segment 106c=0, a node index of the node 102i of the proximity segment 106c=1, and a node index of the node 102j of the proximity segment 106c=2.

Now, let us consider that the node 102e of the proximity segment 106b is updated, for example, by the web service. The node 102e sends data to be synchronized to the nodes 102f and 102g within the proximity segment 106b, as shown in FIG. 2A.

Meanwhile, the addressing regime is employed to address a node of the proximity segment 106c selected for receiving the data, as follows:

K=the segment index of the proximity segment 106b=1
S=the node index of the node 102e=0
M=the number of nodes in the proximity segment 106c=3
Therefore, D=(1+0)%3=1

Accordingly, the node 102e provides the node 102i of the proximity segment 106c with the data to be synchronized, as shown in FIGS. 2A and 2B.

Consequently, the node 102i sends the data to the nodes 102h and 102j within the proximity segment 106c, as shown in FIG. 2A. In this manner, the data is synchronized within the proximity segments 106b and 106c.

Further, the addressing regime may be employed to select separate nodes of the given second proximity segment for receiving data sent by separate nodes of the given first proximity segment and vice versa, as shown in FIG. 2B.

For example, when the node 102f of the proximity segment 106b is updated, K=1, S=1 and M=3. Therefore, D=(1+1)%3=2. Accordingly, the node 102f sends data to be synchronized to the node 102j of the proximity segment 106c.

When the node 102g of the proximity segment 106b is updated, K=1, S=2 and M=3. Therefore, D=(1+2) % 3=0. Accordingly, the node 102g sends data to be synchronized to the node 102h of the proximity segment 106c.

Similarly, when the node 102h of the proximity segment 106c is updated, K=2, S=0 and M=3. Therefore, D=(2+0) % 3=2. Accordingly, the node 102h sends data to be synchronized to the node 102g of the proximity segment 106b.

When the node 102i of the proximity segment 106c is updated, K=2, S=1 and M=3. Therefore, D=(2+1) % 3=0. Accordingly, the node 102i sends data to be synchronized to the node 102e of the proximity segment 106b.

When the node 102j of the proximity segment 106c is updated, K=2, S=2 and M=3. Therefore, D=(2+2) % 3=1. Accordingly, the node 102j sends data to be synchronized to the node 102f of the proximity segment 106b.

In this manner, the addressing regime facilitates even distribution of communication load between the nodes 102e, 102f and 102g of the proximity segment 106b, and the nodes 102h, 102i and 102j of the proximity segment 106c. This, in turn, facilitates reliable communication and synchronization within the proximity segments 106b and 106c.

It should be noted here that the implementation of the addressing regime is not limited to a specific type of segment indices and node indices or a specific number of proximity segments and nodes. FIGS. 2A and 2B are merely examples, which should not unduly limit the scope of the claims herein. One of ordinary skill in the art would recognize many variations, alternatives, and modifications of embodiments herein. For example, the addressing regime has been implemented for synchronizing the data within the proximity segment 106b and the proximity segment 106c for illustration purposes only. The addressing regime may be implemented in a similar manner, in order to synchronize the data mutually between all of the proximity segments 106.

Further, the addressing regime has been employed with the node indices that are continuous non-negative integers ranging from 0 to (y−1), for illustration purposes only. In accordance with another embodiment of the present disclosure, the node indices may be numbers belonging to, for example, a set of odd numbers or a set of even numbers. In such a case, the addressing regime may be modified accordingly to address at least one node in each of the proximity segments 106 for receiving the data to be synchronized.

Figure 3:
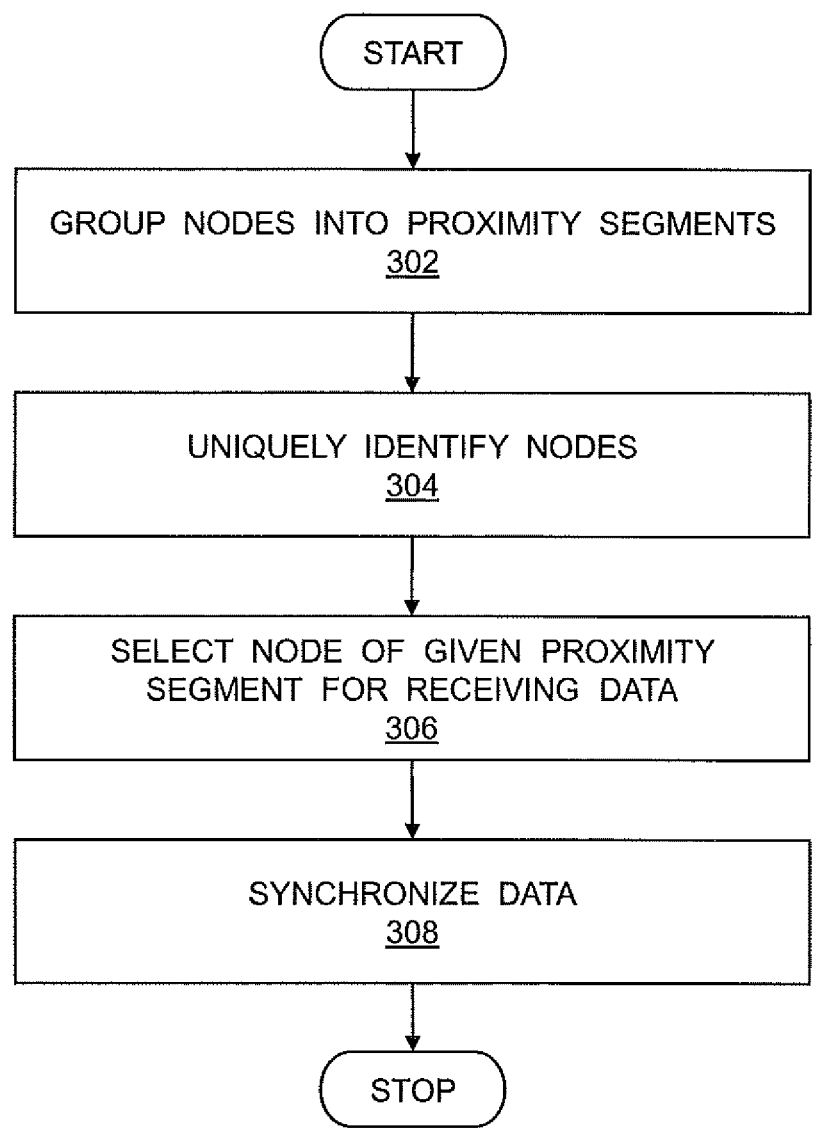
FIG. 3 is an illustration of steps of a method of operating the database cluster arrangement, in accordance with an embodiment of the present disclosure.

FIG. 3 is an illustration of steps of a method of operating the database cluster arrangement 100, in accordance with an embodiment of the present disclosure. The method is depicted as a collection of steps in a logical flow diagram, which represents a sequence of steps that can be implemented in hardware, software, or a combination thereof.

At a step 302, the nodes 102 are grouped into the proximity segments 106. The step 302 may be performed based on the communication characteristics of the communication network 104, as described earlier.

In accordance with the step 302, the nodes 102 may be grouped into the proximity segments 106 in a dynamically changeable manner, as described earlier.

At a step 304, the nodes 102 are uniquely identified by their corresponding IDs. The IDs may, for example, include the segment indices and/or the node indices, as described earlier.

Beneficially, the steps 302 and 304 may be performed in an automatic manner, as and when changes in the database cluster arrangement 100 and/or the communication characteristics are identified. Alternatively, the steps 302 and 304 may be performed by the system administrator of the database cluster arrangement 100.

When a node of a given first proximity segment of the proximity segments 106 is updated, a step 306 is performed. At the step 306, a node of a given second proximity segment of the proximity segments 106 is selected for receiving data to be synchronized. The node of the given second proximity segment may, for example, be selected based upon an ID of the node of the given first proximity segment.

The step 306 may, for example, be performed by the node of the given first proximity segment. Alternatively, the step 306 may be performed by a network device, such as a router, coupling the given first proximity segment and the given second proximity segment in communication with each other.

Consequently, at a step 308, the node of the given first proximity segment operates to send the data to the node of the given second proximity segment selected at the step 306. Upon receiving the data, the node of the given second proximity segment operates to send the data to other nodes within the given second proximity segment.

Meanwhile, the node of the given first proximity segment also operates to send the data to other nodes within the given first proximity segment. In this manner, the data is synchronized mutually within the given first proximity segment and the given second proximity segment.

It should be noted here that the steps 302 to 308 are only illustrative and other alternatives can also be provided where one or more steps are added, one or more steps are removed, or one or more steps are provided in a different sequence without departing from the scope of the claims herein. For example, the step 302 may be performed simultaneously with the step 304.

Figure 4A:
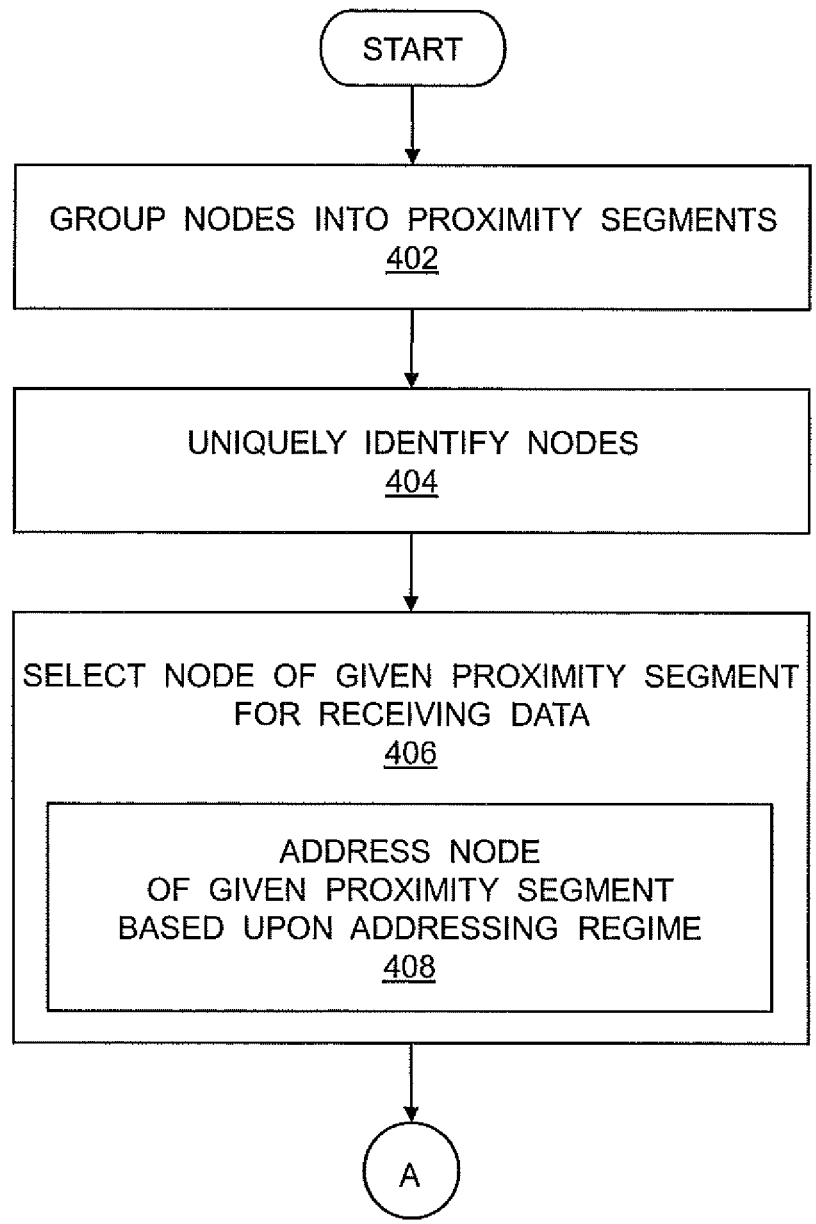
FIGS. 4A and 4B are illustrations of steps of a detailed method of operating the database cluster arrangement, in accordance with an embodiment of the present disclosure.
Figure 4B:
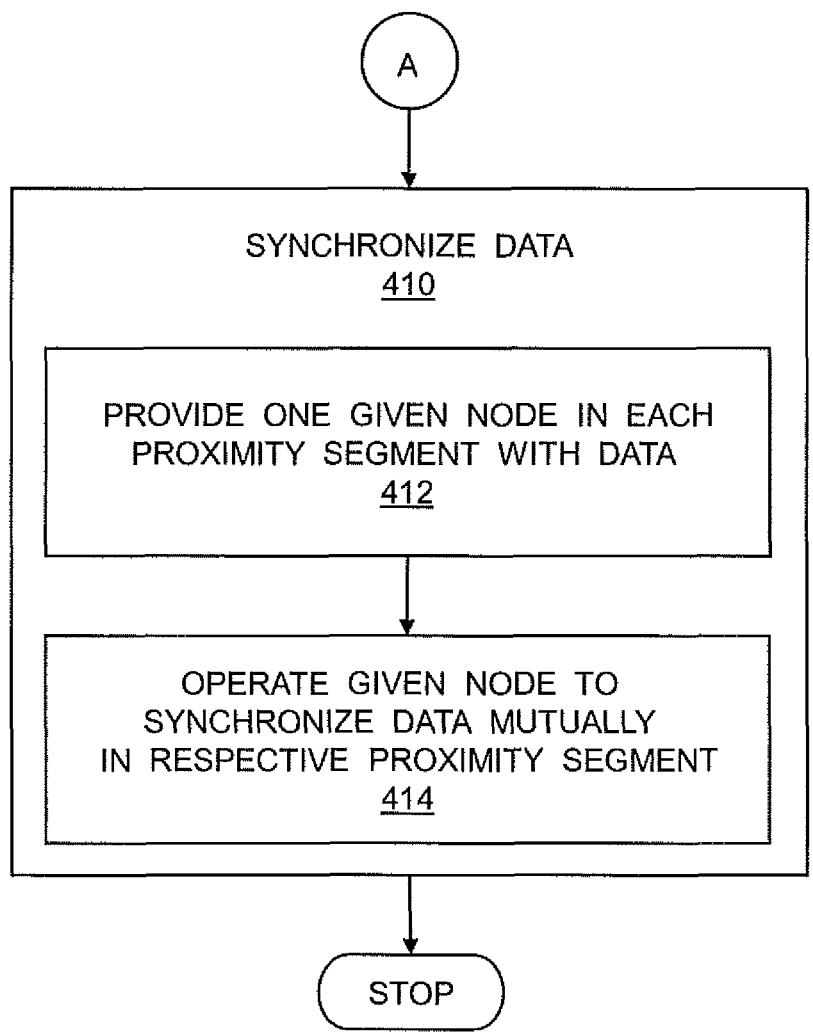

FIGS. 4A and 4B are illustrations of steps of a detailed method of operating the database cluster arrangement 100, in accordance with an embodiment of the present disclosure. The detailed method is depicted as a collection of steps in a logical flow diagram, which represents a sequence of steps that can be implemented in hardware, software, or a combination thereof.

At a step 402, the nodes 102 are grouped into the proximity segments 106. The step 402 may be performed based on the communication characteristics of the communication network 104, as described earlier.

For example, the nodes 102 may be grouped into their respective proximity segments based upon mutually shared LANs to which the nodes 102 belong, while the proximity segments 106 may be mutually coupled via WANs.

In accordance with the step 402, the nodes 102 may be grouped into the proximity segments 106 in a dynamically changeable manner, as described earlier.

At a step 404, the nodes 102 are uniquely identified by their corresponding IDs. The IDs may, for example, be UUIDs, which may be assigned dynamically. One or more octets of these UUIDs may be reserved for providing the segment indices and/or the node indices, as described earlier.

Beneficially, the steps 402 and 404 may be performed in an automatic manner, as and when changes in the database cluster arrangement 100 and/or the communication characteristics are identified. Alternatively, the steps 402 and 404 may be performed by the system administrator of the database cluster arrangement 100.

When a node of a given first proximity segment of the proximity segments 106 (hereinafter referred to as 'first node') is updated, a step 406 is performed. At the step 406, a node of a given second proximity segment of the proximity segments 106 (hereinafter referred to as 'second node') is selected for receiving data to be synchronized. The second node may, for example, be selected based upon an ID of the first node.

The step 406 includes a step 408 at which the second node is addressed based substantially upon the aforementioned addressing regime.

The steps 406 and 408 may, for example, be performed by the first node. Alternatively, the steps 406 and 408 may be performed by a network device, such as a router, coupling the given first proximity segment and the given second proximity segment in communication with each other.

Consequently, at a step 410, the data is synchronized mutually within the given first proximity segment and the given second proximity segment. For this purpose, the step 410 includes a step 412 and a step 414.

At the step 412, the first node operates to send the data to the second node selected at the step 406.

Beneficially, upon receiving the data, the second node may analyze an ID of the first node to check whether or not a segment index of the given first proximity segment is different from a segment index of the given second proximity segment. If it is found that the segment index of the given first proximity segment is different from the segment index of the given second proximity segment, the step 414 is performed.

At the step 414, the second node operates to send the data to other nodes within the given second proximity segment. For this purpose, the second node may send the data, for example, by using unicast, multicast, broadcast, or other suitable communication protocols available within the given second proximity segment. Consequently, the data is synchronized mutually within the given second proximity segment.

Meanwhile, the first node also operates to send the data to other nodes within the given first proximity segment. For this purpose, the first node may send the data, for example, by using unicast, multicast, broadcast, or other suitable communication protocols available within the given first proximity segment. Consequently, the data is synchronized mutually within the given first proximity segment.

In order to synchronize the data mutually within all of the proximity segments 106, the steps 406 to 414 may be performed for all of the proximity segments 106. Accordingly, the first node may operate to provide at least one given node in each of the proximity segments 106 with the data to be synchronized. The at least one given node may then operate to send the data to other nodes within its respective proximity segment, thereby synchronizing the data mutually within its respective proximity segment.

It should be noted here that the steps 402 to 414 are only illustrative and other alternatives can also be provided where one or more steps are added, one or more steps are removed, or one or more steps are provided in a different sequence without departing from the scope of the claims herein. For example, the step 402 may be performed simultaneously with the step 404.

Embodiments of the present disclosure can be used for various purposes, including, though not limited to, enabling even distribution of communication load between nodes in a database cluster arrangement, facilitating reliable and efficient communication and synchronization of data across WANs, and enabling disaster recovery during events of failure.

Database cluster arrangement is only one, non limiting, example of the embodiments. In general embodiments can apply to any group communication system. In general aspects of the embodiments provide improvement in any communication system utilizing group communication systems (GCS). Example services where the aspects can be used include video streaming, video conferencing etc.

Group Communication System refer to a software that implements message exchange between two or more processes (processors) in a computer network that constitute a "group". Group Communication is characterized by formal message delivery guarantees expressed in terms of group membership and the order of delivery to group members. E.g. FIFO (First in First Out) order, AGREED order, TOTAL order, etc. The purpose of Group Communication theory is to establish a formal approach to message delivery failures in computer networks and recovery from those.

Examples of group communication systems include: IS-IS (Intermediate System to Intermediate System), JGroups, Spread Toolkit, Appia framework, QuickSilver, and the group services component of IBM's RSCT (Reliable Scalable Cluster Technology). Group Communication systems are most useful in implementing data replication systems.

Group communication systems commonly provide specific guarantees about the total ordering of messages, such as, that if the sender of a message receives it back from the GCS, then it is certain that it has been delivered to all other nodes in the system. This property is useful when constructing data replication systems as discussed earlier.

The embodiments of are not limited to database server. In general any server system or computing system capable of communicating information can be used.

The term "synchronization" in this embodiment can refer in general sending and receiving data between nodes. The term "replicating" can also be used for sending and receiving changes made in a transactions on the database.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present.

Reference to the singular is also to be construed to relate to the plural.

What is claimed is:

1. A group communication system arrangement including a plurality of node devices which are mutually coupled in communication to exchange in operation data therebetween, wherein the node devices are uniquely identified by corresponding identifiers (ID);

the node devices are grouped into proximity segments, depending upon communication characteristics between the node devices, the communication characteristics comprising one or more of a communication rate achievable between the node devices, and a cost of communication between the node devices; and a node device of a given second proximity segment of the proximity segments is selected for receiving data, wherein the node device of the given second proximity segment is selected based upon an ID of a node device of a given first proximity segment of the proximity segments which is operable to send the data to the node device of the given second proximity segment, and the number of node devices in the given second proximity segment.

2. A group communication system arrangement as claimed in claim 1, wherein the node devices are grouped into their respective proximity segments based upon mutually shared Local Area Networks (LAN) to which the node devices belong.

3. A group communication system arrangement as claimed in claim 1, wherein the node devices are operable to synchronize the data mutually within their respective proximity segments.

4. A group communication system arrangement as claimed in claim 1, wherein at least one given node device in each proximity segment is provided with the data to be synchronized with other node devices within its respective proximity segment.

5. A group communication system arrangement as claimed in claim 1, wherein the node device of the given second proximity segment is addressed based substantially upon an addressing regime, wherein:

$$D=(K+S)\% M$$

wherein

D is a node index of the node device of the given second proximity segment, or a process associated therewith;

K is a segment index of the given first proximity segment;

S is a node index of the node device of the given first proximity segment, or a process associated therewith;

M is a number of node devices in the given second proximity segment; and

% is a modulus function.

6. A group communication system arrangement as claimed in claim 1, wherein the given second proximity segment and the given first proximity segment are mutually coupled via a Wide Area Network (WAN).

7. A group communication system arrangement as claimed in claim 1, wherein the node devices are grouped into the proximity segments in a dynamically changeable manner, based upon communication characteristics of one or more communication networks via which data is communicated between the node devices.

8. A group communication system arrangement as claimed in claim 1, wherein the communication system is a database cluster arrangement.

9. The system of claim 1, wherein the node of the given second proximity segment receives data and synchronizes a corresponding database if the received data came from a node within the second proximity segment or synchronizes the corresponding database and sends the received data to other nodes in the second proximity segment if the received data came from a node outside of the second proximity segment.

10. A method of operating a group communication system arrangement including a configuration of nodes which are mutually coupled in communication to exchange in operation data therebetween, wherein the method includes:

grouping the nodes into proximity segments, depending upon communication characteristics between the nodes, the communication characteristics comprising one or more of a communication rate achievable between the nodes, and a cost of communication between the nodes;

uniquely identifying the nodes by corresponding identifiers (ID); and selecting a node of a given second proximity segment of the proximity segments for receiving data to be synchronized, wherein the node of the given second proximity segment is selected based upon an ID of a node of a given first proximity segment of the proximity segments which is operable to send the data to the node of the given second proximity segment, and the number of node devices in the given second proximity segment; and operating the nodes to synchronize the data mutually within their respective proximity segments.

11. A method as claimed in claim 10, wherein the method includes grouping the nodes into their respective proximity segments based upon at least one of: a mutual Quality-of-Service (QoS) of communication, a communication rate achievable between the nodes, and/or a cost of communication between the nodes.

12. A method as claimed in claim 10, wherein the method includes grouping the nodes into their respective proximity segments based upon mutually shared Local Area Networks (LAN) to which the nodes belong.

13. A method as claimed in claim 10, wherein the method includes providing at least one given node in each proximity segment with the data to be synchronized with other nodes within its respective proximity segment.

14. A method as claimed in claim 10, wherein the method includes addressing the node of the given second proximity segment based substantially upon an addressing regime, wherein:

$$D=(K+S)\% M$$

wherein

D is a node index of the node of the given second proximity segment, or a process associated therewith;

K is a segment index of the given first proximity segment;

S is a node index of the node of the given first proximity segment, or a process associated therewith;

M is a number of nodes in the given second proximity segment; and

% is a modulus function.

15. A method as claimed in claim 10, wherein the method includes mutually coupling the given second proximity segment and the given first proximity segment via a Wide Area Network (WAN).

16. A method as claimed in claim 10, wherein the method includes grouping the nodes into the proximity segments in a dynamically changeable manner, based upon communication characteristics of one or more communication networks via which data is communicated between the nodes.

17. A method as claimed in claim 10 where the group communication system is a database cluster arrangement.

18. The method according to claim 10, comprising that the node of the given second proximity segment receives data and synchronizes a corresponding database if the received data came from a node within the second proximity segment or synchronizes the corresponding database and sends the received data to other nodes in the second proximity segment if the received data came from a node outside of the second proximity segment.

19. A software product recorded on non-transitory machine-readable data storage media, wherein the software product is executable upon computing hardware for implementing a method of operating a group communication system arrangement including a configuration of nodes which are mutually coupled in communication to exchange in operation data therebetween, wherein the method includes:

grouping the nodes into proximity segments, depending upon communication characteristics between the nodes, the communication characteristics comprising one or more of a communication rate achievable between the nodes, and a cost of communication between the nodes;

uniquely identifying the nodes by corresponding identifiers (ID); and selecting a node of a given second proximity segment of the proximity segments for receiving data to be synchronized, wherein the node of the given second proximity segment is selected based upon an ID of a node of a given first proximity segment of the proximity segments which is operable to send the data to the node of the given second proximity segment; and operating the nodes to synchronize the data mutually within their respective proximity segments.

* * * * *